United States Patent
Itoga et al.

(10) Patent No.: US 7,706,958 B2
(45) Date of Patent: Apr. 27, 2010

(54) EGR CONTROL APPARATUS AND METHOD FOR INTERNAL COMBUSTION ENGINE

(75) Inventors: Chiho Itoga, Saitama-ken (JP); Ken Ogawa, Saitama-ken (JP); Toru Kitamura, Saitama-ken (JP); Toshinari Shinohara, Saitama-ken (JP)

(73) Assignee: Honda Motor Co., Ltd., Tokyo (JP)

(*) Notice: Subject to any disclaimer, the term of this patent is extended or adjusted under 35 U.S.C. 154(b) by 287 days.

(21) Appl. No.: 12/005,705

(22) Filed: Dec. 27, 2007

(65) Prior Publication Data

US 2008/0162020 A1 Jul. 3, 2008

(30) Foreign Application Priority Data

Dec. 27, 2006 (JP) .............................. 2006-352503

(51) Int. Cl.
*G06F 19/00* (2006.01)
*F02M 25/07* (2006.01)
*F02B 47/08* (2006.01)

(52) U.S. Cl. .................. 701/108; 123/568.14; 123/295; 701/103

(58) Field of Classification Search ... 123/90.15–90.18, 123/295, 305, 316, 435, 568.11, 568.14, 123/568.21; 701/101–105, 108, 110, 111, 701/115; 60/605.2
See application file for complete search history.

(56) References Cited

U.S. PATENT DOCUMENTS 6,012,431 A * 1/2000 Itoyama et al. .............. 701/108
6,848,435 B2 * 2/2005 Kitamura et al. ........ 123/568.11
7,128,051 B2 * 10/2006 Nogi et al. .................. 123/348
7,314,041 B2 * 1/2008 Ogawa et al. .......... 123/568.14

(Continued)

FOREIGN PATENT DOCUMENTS

JP          8-170551          7/1996

(Continued)

OTHER PUBLICATIONS

Japanese Office Action for Application No. 2006-352503, dated May 12, 2009.

*Primary Examiner*—Willis R Wolfe, Jr.
(74) *Attorney, Agent, or Firm*—Lahive & Cockfield, LLP; Anthony A. Laurentano

(57) ABSTRACT

An EGR control apparatus and method for an internal combustion engine which burns an air-fuel mixture with self ignition in addition to a flame propagation combustion, are provided for improving the combustion efficiency, engine output, drivability, and exhaust gas characteristics in an internal combustion engine which involves a self ignition combustion of an air-fuel mixture in addition to a flame propagation combustion. The EGR control apparatus comprises an ECU which selects one of a stratified self ignition mode, a stratified flame propagation combustion mode, and a homogeneous flame propagation combustion mode, sets a total target EGR amount and a target in-cylinder gas temperature in accordance with the selected combustion mode, calculates a target internal EGR amount in accordance with the value, calculates a target external EGR amount by subtracting the target internal EGR amount from the total target EGR amount, and controls the internal EGR amount and the external EGR amount to be the target internal EGR amount and the target external EGR amount, respectively, by driving three mechanisms.

8 Claims, 9 Drawing Sheets

U.S. PATENT DOCUMENTS

| | | | |
|---|---|---|---|
| 7,392,797 B2 * | 7/2008 | Ogawa et al. | 123/568.14 |
| 7,444,999 B2 * | 11/2008 | Kitamura et al. | 123/568.11 |
| 2007/0074707 A1 * | 4/2007 | Ogawa et al. | 123/568.14 |
| 2008/0162021 A1 * | 7/2008 | Itoga et al. | 701/108 |
| 2009/0240422 A1 * | 9/2009 | Itoga et al. | 701/108 |

FOREIGN PATENT DOCUMENTS

| | | | |
|---|---|---|---|
| JP | 10-205394 | 8/1998 | |
| JP | 11-141372 | 5/1999 | |
| JP | 11/210539 | 8/1999 | |
| JP | 2001-3800 | 1/2001 | |
| JP | 2001-152908 | 6/2001 | |
| JP | 2001-289092 | 10/2001 | |
| JP | 2002-130006 | 5/2002 | |
| JP | 2007100526 A * | 4/2007 | 701/108 |

* cited by examiner

F I G. 1
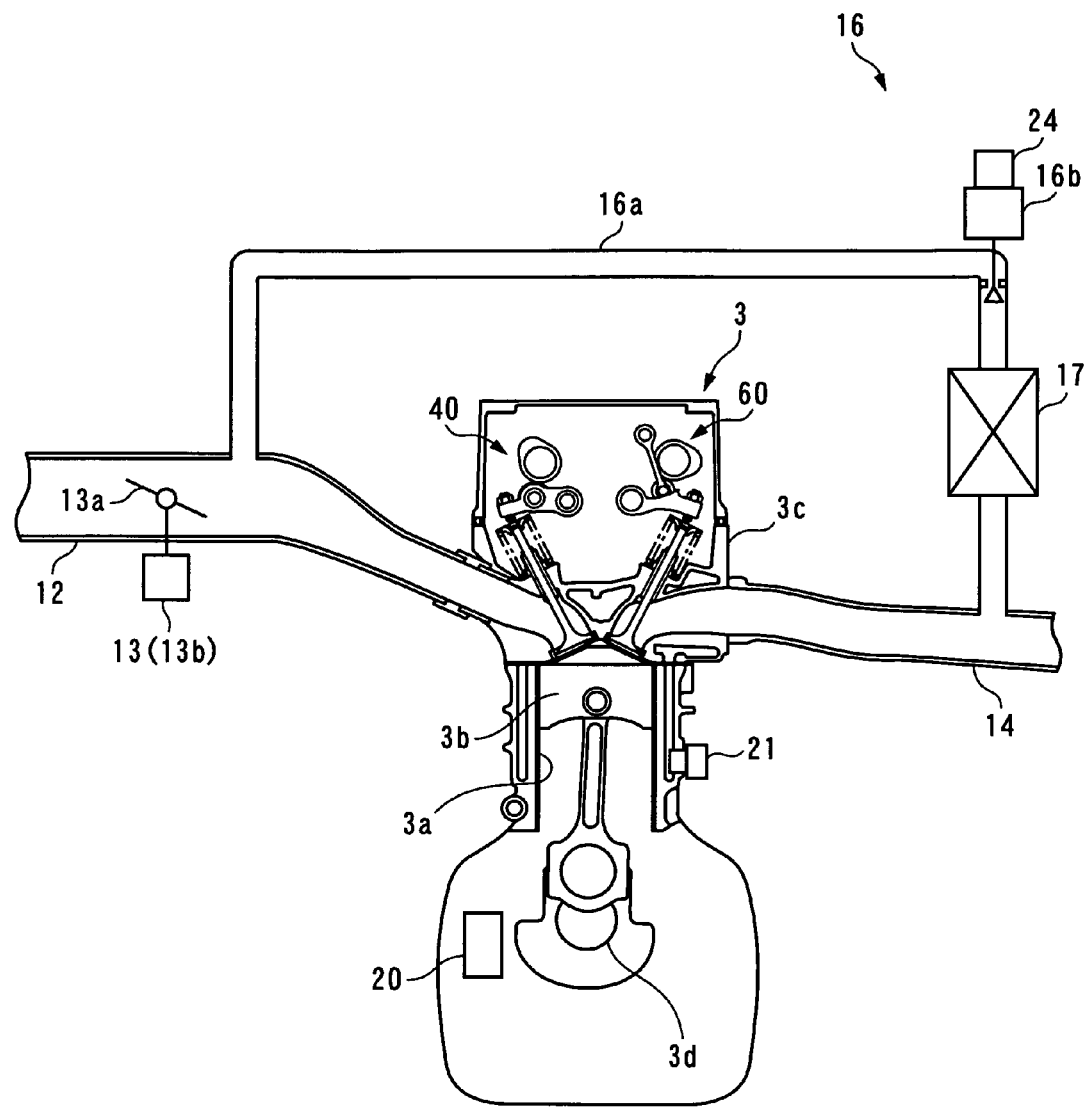

EGR CONTROL APPARATUS AND METHOD FOR INTERNAL COMBUSTION ENGINE

BACKGROUND OF THE INVENTION

1. Field of the Invention

The present invention relates to an EGR control apparatus and method for an internal combustion engine for burning an air-fuel mixture with self ignition while auxiliary using a spark ignition.

2. Description of the Prior Art

Conventionally, as an EGR control apparatus for an internal combustion engine, one described, for example, in Laid-open Japanese Patent Application No. 11-210539 is known. This internal combustion engine is of a type which can be operated by switching between a self ignition combustion mode for burning an air-fuel mixture with self ignition while auxiliary using a spark ignition and a flame propagation combustion mode for burning an air-fuel mixture with flame propagation using a spark ignition. This internal combustion engine comprises an EGR control valve for controlling the amount of exhaust gases recirculated from an exhaust passage to an intake passage, and a valve timing mechanism for changing opening/closing timings of an intake air valve by changing the phase of an intake cam shaft with respect to a crank shaft. The EGR control apparatus also comprises an intake air temperature sensor for detecting an intake air temperature, and calculates a gas temperature TE which is the temperature of an air-fuel mixture within a cylinder, i.e., an unburnt gas at the timing of ignition.

In a control process shown in FIG. 7 of this EGR control apparatus, it is determined, in accordance with an engine load and an engine rotational speed, whether an operating condition of the internal combustion engine is in an operation range 1 in which the flame propagation combustion mode can be executed, or in operation ranges 2, 3 in which the self ignition combustion mode can be executed (step 100), and a target temperature TEO and a gas temperature TE are calculated when it is determined that the internal combustion engine is in the operation ranges 2, 3 in which the self ignition combustion mode can be executed (steps 102, 103). Then, when TE>TEO is established, the opening of the EGR control valve is controlled toward a decreasing side by a predetermined value in order to reduce the gas temperature TE (step 105). On the other hand, when TE≦TEO is established, the opening of the EGR control valve is controlled toward an increasing side by a predetermined value in order to increase the gas temperature TE (step 106). Also, in this EGR control apparatus, when the operating condition of the internal combustion engine is in the operation range 3 of high loads, where it is difficult to increase the gas temperature TE to a predetermined range with recirculated gases, the flame propagation combustion mode is executed with a normal spark ignition (Paragraphs [0037], [0038], [0048]).

According to the conventional EGR control apparatus for the internal combustion engine, a high-temperature recirculated gas is recirculated into a combustion chamber through the EGR control valve in order to increase the gas temperature TE to a predetermined range with the EGR control, so that when the normal flame propagation combustion mode is executed while the operating condition of the internal combustion engine is in the operation range 3 of high loads, a reduction in combustion temperature by the recirculated gas cannot be made for purposes of avoiding knocking. As a result, in order to avoid knocking, an ignition timing retard control and the like are obliged to be executed, possibly resulting in a reduction in combustion efficiency, engine output, and drivability.

SUMMARY OF THE INVENTION

The present invention has been made to solve the problems as mentioned above, and it is an object of the invention to provide an EGR control apparatus and method for an internal combustion engine which are capable of improving the combustion efficiency, engine output, drivability, and exhaust gas characteristics in an internal combustion engine which involves a self ignition combustion of an air-fuel mixture in addition to a flame propagation combustion.

To achieve the above object, according to a first aspect of the present invention, there is provided an EGR control apparatus for an internal combustion engine which has an external EGR device for changing the amount of exhaust gases discharged from a cylinder to an exhaust passage and recirculated into the cylinder as an external EGR amount, and an internal EGR device for changing the amount of previously burnt gases generated in the cylinder which is left within the cylinder as a gas at a higher temperature than the exhaust gases as an internal EGR amount, and is operated in a combustion mode which is switched among a plurality of combustion modes including a stratified self ignition combustion mode for burning a stratified air-fuel mixture with self ignition, a stratified flame propagation combustion mode for burning the stratified air-fuel mixture with a spark ignition, and a homogeneous flame propagation combustion mode for burning a homogeneous air-fuel mixture with a spark ignition. The EGR control apparatus is characterized by comprising combustion mode selecting means for selecting one of the plurality of combustion modes; total target EGR amount calculating means for calculating a total target EGR amount which is a target for the sum total of the internal EGR amount and the external EGR amount in accordance with the selected combustion mode; target in-cylinder gas temperature setting means for setting a target temperature of an unburnt gas within the cylinder as a target in-cylinder gas temperature in accordance with the selected combustion mode; target internal EGR amount calculating means for calculating a target internal EGR amount which is a target of the internal EGR amount in accordance with the set target in-cylinder gas temperature; target external EGR amount calculating means for calculating a target external EGR amount which is a target of the external EGR amount by subtracting the calculated target internal EGR amount from the calculated total target EGR amount; and EGR control means for controlling the internal EGR amount and the external EGR amount, respectively, so as to reach the target internal EGR amount and the target external EGR amount by driving the internal EGR device and the external EGR device.

According to this EGR control apparatus for an internal combustion engine, the total target EGR amount and the target in-cylinder gas temperature are calculated in accordance with a selected combustion mode, the target internal EGR amount is calculated in accordance with the target in-cylinder gas temperature, and the target external EGR amount is calculated by subtracting the target internal EGR amount from the total target EGR amount. Then, by driving the internal EGR device and the external EGR device, the internal EGR amount and the external EGR amount are controlled, respectively, so as to reach the thus calculated target internal EGR amount and target external EGR amount. By controlling the internal EGR amount and the external EGR amount in this way, the temperature of a stratified air-fuel mixture within the cylinder can be increased to such a temperature at which it can appropriately burns with self ignition when the stratified self ignition combustion mode is selected, making it possible to ensure that the stratified air-fuel mixture is burnt with self ignition.

As a result, technical advantages can be provided, as described below, when the stratified air-fuel mixture is burnt with self ignition. Specifically, since a more stable combustion state can be provided than when a homogeneous air-fuel mixture is burnt, due to the combustion characteristics of the stratified air-fuel mixture, the total target EGR amount can be set to a value larger than the homogeneous flame propagation combustion mode. In this way, the throttle valve opening can be controlled to a larger value, when the internal combustion engine comprises a throttle valve mechanism, thereby reducing a pumping loss, the combustion efficiency can be increased, and a good fuel efficiency can be ensured. In addition, the combustion temperature can be reduced because the entire stratified air-fuel mixture simultaneously burns, it is possible to reduce the amount of emitted NOx and improve the exhaust gas characteristic.

Also, when the stratified flame propagation combustion mode is selected, the total target EGR amount can be set to a larger value than in the homogeneous flame propagation combustion mode because a more stable combustion state can be provided than when a homogeneous air-fuel mixture is burnt, due to the combustion characteristics of the stratified air-fuel mixture, as is the case with the stratified self ignition combustion mode. In this way, the combustion efficiency can be improved, while reducing the pumping loss, as compared with the homogeneous flame propagation combustion mode, making it possible to ensure a good fuel efficiency. In this way when the proportion of the target external EGR amount is higher in the total target EGR amount, the amount of emitted NOx can be reduced by reducing the combustion temperature, thus improving the exhaust gas characteristic. On the other hand, when the proportion of the target internal EGR amount is higher in the total target EGR amount, a partial self ignition combustion can be produced by increasing the combustion temperature, thereby making it possible to reduce the amount of emitted NOx and improve the exhaust gas characteristic.

Further, when the stratified flame propagation combustion mode is selected, the total target EGR amount is set to an upper limit value in a region in which no reduction in combustion state arises, thereby making it possible to reduce a pumping loss as much as possible while ensuring a good combustion state. In addition, by setting the proportion of a low-temperature recirculated gas, as compared with previously burnt gases, higher in the total target EGR amount, the knocking can be appropriately prevented from occurring by the recirculated gas, while avoiding the ignition timing retard control as much as possible, thereby making it possible to improve the combustion efficiency, engine output, and drivability.

To achieve the above object, according to a second aspect of the present invention, there is provided an EGR control method for an internal combustion engine which has an external EGR device for changing the amount of exhaust gases discharged from a cylinder to an exhaust passage and recirculated into the cylinder as an external EGR amount, and an internal EGR device for changing the amount of previously burnt gases generated in the cylinder which is left within the cylinder as a gas at a higher temperature than the exhaust gases as an internal EGR amount, and is operated in a combustion mode which is switched among a plurality of combustion modes including a stratified self ignition combustion mode for burning a stratified air-fuel mixture with self ignition, a stratified flame propagation combustion mode for burning the stratified air-fuel mixture with a spark ignition, and a homogeneous flame propagation combustion mode for burning a homogeneous air-fuel mixture with a spark ignition. The EGR control method is characterized by comprising the steps of selecting one of the plurality of combustion modes; calculating a total target EGR amount which is a target for the sum total of the internal EGR amount and the external EGR amount in accordance with the selected combustion mode; setting a target temperature of an unburnt gas within the cylinder as a target in-cylinder gas temperature in accordance with the selected combustion mode; calculating a target internal EGR amount which is a target of the internal EGR amount in accordance with the set target in-cylinder gas temperature; calculating a target external EGR amount which is a target of the external EGR amount by subtracting the calculated target internal EGR amount from the calculated total target EGR amount; and controlling the internal EGR amount and the external EGR amount, respectively, so as to reach the target internal EGR amount and the target external EGR amount by driving the internal EGR device and the external EGR device.

This method provides the same advantageous effects as described above concerning the abnormality determining apparatus according to the first aspect of the invention.

Preferably, in the EGR control apparatus for an internal combustion engine described above, the total target EGR amount calculating means sets the total target EGR amount to a larger value when one of the stratified self ignition combustion mode and the stratified flame propagation combustion mode is selected than when the homogeneous flame propagation combustion mode is selected.

According to this preferred embodiment of the EGR control apparatus for an internal combustion engine, when the combustion mode of the internal combustion engine is the stratified self ignition combustion mode or the stratified flame propagation combustion mode, the total target EGR amount is set to a larger value than when in the homogeneous flame propagation combustion mode. In this event, in the stratified self ignition combustion mode and the stratified flame propagation combustion mode, a stable combustion state can be provided even when the EGR amount is increased, as compared with the homogeneous flame propagation combustion mode which burns a homogeneous air-fuel mixture, due to the combustion characteristic of a stratified air-fuel mixture. Accordingly, the combustion efficiency can be improved, while reducing the pumping loss, as compared with the homogeneous flame propagation combustion mode, thus ensuring a good fuel efficiency.

Preferably, in the EGR control method for an internal combustion engine described above, the total target EGR amount calculating step includes setting the total target EGR amount to a larger value when one of the stratified self ignition combustion mode and the stratified flame propagation combustion mode is selected than when the homogeneous flame propagation combustion mode is selected.

This preferred embodiment of the EGR control method provides the same advantageous effects as described above concerning the control apparatus according to the first aspect of the invention.

Preferably, in the EGR control apparatus for an internal combustion engine described above, the internal EGR device is a lift varying mechanism for continuously changing a lift of at least one of an intake air valve and an exhaust air valve.

Preferably, in the EGR control apparatus for an internal combustion engine described above, the internal EGR device is a phase varying mechanism for continuously changing a relative phase of at least one of an intake cam shaft and an exhaust cam shaft to a crank shaft.

BRIEF DESCRIPTION OF THE DRAWINGS

FIG. 1 is a diagram generally showing an internal combustion engine to which an EGR control apparatus according to one embodiment of the present invention is applied;

DETAILED DESCRIPTION OF THE EMBODIMENT

Figure 2:
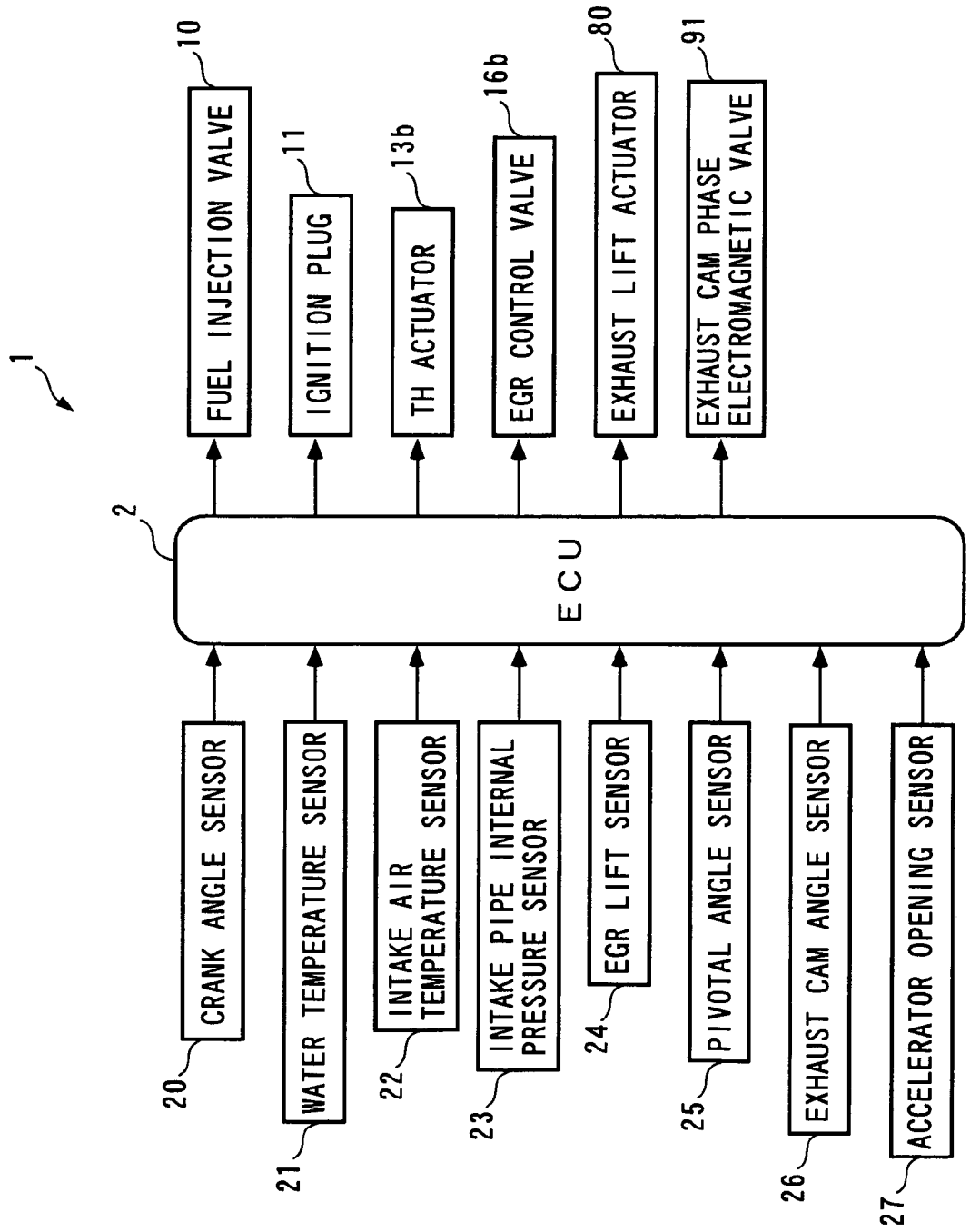
FIG. 2 is a block diagram generally showing the configuration of the EGR control apparatus.

In the following, an EGR control apparatus for an internal combustion engine according to one embodiment of the present invention will be described with reference to the drawings. As shown in FIG. 2, this EGR control apparatus 1 comprises an ECU 2, and this ECU 2 executes a variety of control processes such as an EGR control process in accordance with an operating condition of the internal combustion engine (hereinafter referred to as the "engine") 3, as will be later described.

Figure 3:
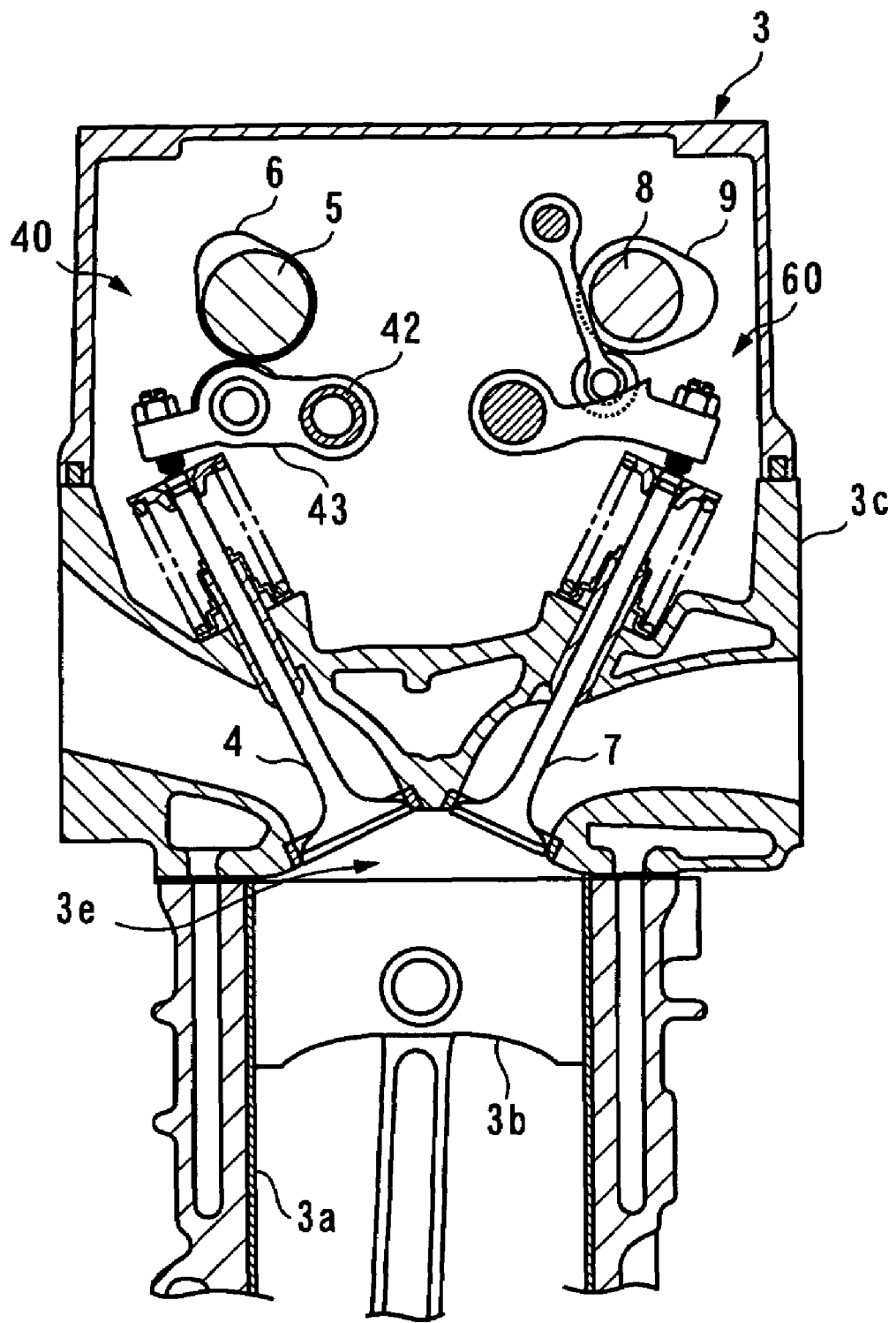
FIG. 3 is across-sectional view generally showing the configuration of an intake side valve actuation mechanism and an exhaust side valve actuation mechanism of the internal combustion engine.

As shown in FIGS. 1 and 3, the engine 3 is an in-line four-cylinder type four cycle gasoline engine which has four sets of cylinders 3a and pistons 3b (only one set of which is shown) and is equipped in a vehicle (not shown), and a combustion chamber 3e is formed between the piston 3b of each cylinder 3a and a cylinder head 3c.

The engine 3 comprises a pair of intake valves 4, 4 (only one of which is shown) provided for each cylinder 3a, a pair of exhaust gas valves 7, 7 (only one of which is shown), an intake side valve actuation mechanism 40 having an intake cam shaft 5, and an intake cam 6 for driving each intake air valve 4 to open and close, an exhaust side, an exhaust side valve actuation mechanism 60 having an exhaust cam shaft 8 and an exhaust cam 9 for driving each exhaust gas valve 7 to open and close, a fuel injection valve 10 (see FIG. 2), an ignition plug 11 (see FIG. 2), and the like.

The intake cam shaft 5 and the exhaust cam shaft 8 are pivotably attached to the cylinder head 3c, respectively, through holders not shown, and extends along a direction in which the cylinders 3a are arranged. An intake sprocket (not shown) is axially disposed on one end of the intake cam shaft 5, and is rotatably provided.

This intake sprocket is fixed to the intake cam shaft 5, and is linked to the crank shaft 3d through a timing chain, not shown. With the foregoing configuration, the intake cam shaft 5 rotates once each time the crank shaft 3d rotates twice. Also, the intake cam 6 is provided on the intake cam shaft 5 for each cylinder 3a so s to integrally rotate therewith.

The intake side valve actuation mechanism 40 drives the intake air valve 4 of each cylinder 4 to open and close through the rotation of the intake cam shaft 5 associated with the rotation of the crank shaft 3d, and comprises an intake cam shaft 5, an intake cam 6, a rocker arm shaft 52, and two rocker arms 43, 43 (only one of which is shown), and the like. In this intake side valve actuation mechanism 40, as the intake cam shaft 5 rotates, the two rocker arms 43, 43 pivotally move about the rocker arm shaft 42, thereby driving the intake air valve 4 to open and close.

Further, an exhaust sprocket (not shown) is coaxially disposed and rotatably provided on one end of the exhaust cam shaft 8. This exhaust sprocket is linked to the crank shaft 3d through a timing chain, not shown, and is linked to the exhaust cam shaft 8 through an exhaust cam phase varying mechanism 90, later described. With the foregoing configuration, the exhaust cam shaft 8 rotates once as the crank shaft 3d rotates twice. Further, the exhaust cam 9 is provided on the exhaust cam shaft 8 for each cylinder 3a so as to integrally rotate therewith.

Further, the exhaust side valve actuation mechanism 60 drives the exhaust gas valve 7 of each cylinder 3a to open and close through the rotation of the exhaust cam shaft 8 associated with the rotation of the crank shaft 3d, and is comprised of a variable valve actuation mechanism for continuously changing a maximum lift and a valve timing of the exhaust gas valve 7, as will be later described. In this regard, in this embodiment, the "maximum lift of the exhaust gas valve 7 (hereinafter referred to as the "exhaust lift") represents a maximum lift stroke of the exhaust gas valve 7.

On the other hand, the fuel injection valve 10 is provided for each cylinder 3a, and is attached to the cylinder head 3c so as to directly inject a fuel into the combustion chamber 3e. In other words, the engine 3 is configured as a direct injection engine. Also, the fuel injection valve 10 is electrically connected to the ECU 2, and a valve opening time and a valve opening timing thereof are controlled by the ECU 2, as will be later described.

The ignition plug 11 is also provided for each cylinder 3a, and is attached to the cylinder head 3c. The ignition plug 11 is electrically connected to the ECU 2, and its discharge state is controlled by the ECU 2 such that an air-fuel mixture within the combustion chamber 3e is burnt at a timing in accordance with an ignition timing, later described.

On the other hand, the engine 3 is provided with a crank angle sensor 20 and a water temperature sensor 21. This crank angle sensor 20 is comprised of a magnet rotor and an MRE pickup, and outputs a CRK signal and a TDC signal, both of which are pulse signals, to the ECU 2 as the crank shaft 3d rotates.

This CRK signal is such that one-pulse is output per predetermined crank angle (for example, 10°), and the ECU 2 calculates the rotational speed of the engine 3 (hereinafter referred to as the "engine rotational speed") based on this CRK signal. The TDC signal in turn is a signal which indicates that the piston 3b of each cylinder 3a is present at a predetermined crank angle position slightly in front of the TDC position of an intake stroke, and one pulse is output per predetermined crank angle.

Further, the water temperature sensor 21 detects the temperature of cooling water which recirculates within a cylinder block of the engine 3, and outputs a detection signal indicative of that to the ECU 2.

On the other hand, the intake pipe 12 of the engine 3 is provided with a throttle valve mechanism 13, and this throttle valve mechanism 13 comprises a throttle valve 13a, a TH actuator 13b for driving the same to open and close, and the like. The throttle valve 13a is pivotably provided in the middle of the intake pipe 12, and changes the fresh air amount within the intake pipe 12 by a change in the opening associated with the pivotal movement.

The TH actuator 13b is a combination of a motor connected to the ECU with a gear mechanism (none of which is shown), and is driven by a control input from the ECU 2 to change the opening TH of the throttle valve 13a (hereinafter referred to as the "throttle valve opening"). With the foregoing configuration, the ECU 2 controls the throttle valve opening TH to reach a target throttle valve opening TH_CMD, later described, through the throttle valve mechanism 13.

An intake air temperature sensor 22 and an intake pipe internal pressure sensor 23 (see FIG. 2 for both) are provided in the intake pipe 12 at locations downstream of the throttle valve mechanism 13. The intake air temperature sensor 22 detects the temperature TA of air flowing through the intake pipe 12 (hereinafter referred to as the "intake air temperature"), and outputs a detection signal indicative of that to the ECU 2.

The intake pipe internal pressure sensor 23, which is comprised, for example, of a semiconductor pressure sensor or the like, detects the pressure PBA within the intake pipe 12 (hereinafter referred to as the "intake pipe internal pressure"), and outputs a detection signal indicative of that to the ECU 2. This intake pipe internal pressure PBA is detected as an absolute pressure.

The engine 3 is also provided with an exhaust gas recirculation mechanism 16 (external EGR device). This exhaust gas recirculation mechanism 16 recirculates exhaust gases within the exhaust pipe 14 (exhaust passage) back toward the intake pipe 12, and is comprised of an EGR pipe 16 connected between the intake pipe 12 and the exhaust pipe 14, an EGR control valve 16b for opening and closing the EGR pipe 16a, and the like. The EGR pipe 16a has one end open to a portion of the exhaust pipe 14 upstream of a catalyzer (not show), and the other end open to a portion of the intake pipe downstream of the throttle valve mechanism 13.

The EGR control valve 16b in turn is of a linear electromagnetic valve type, and is configured to have its lift (hereinafter referred to as the "EGR lift") linearly change between a maximum value and a minimum value in accordance with a control input from the ECU 2, thereby changing the opening of the EGR pipe 16a, i.e., the amount of recirculated exhaust gases (hereinafter referred to as the "external EGR amount").

An EGR lift sensor 24 is attached to the EGR control valve 16b, such that the EGR lift sensor 24 detects an actual EGR lift LACT of the EGR control valve 16b, and outputs a detection signal indicative of that to the ECU 2. The ECU 2 controls the external EGR amount through the EGR control valve 16b, as will be later described. In this regard, in the following description, the recirculation of exhaust gases by the exhaust gas recirculation mechanism 16 is referred to as the "external EGR," and recirculated gases associated therewith are referred to as the "external EGR gases."

An EGR cooler 17 is also provided at a location of the EGR pipe 16a upstream of the EGR control valve 16b. This EGR cooler 17 is of a water cooling type which uses cooling water of the engine 3 as a coolant, and the external EGR gases are cooled down through heat exchange with the cooling water when they passes through the EGR cooler 17.

Figure 4:
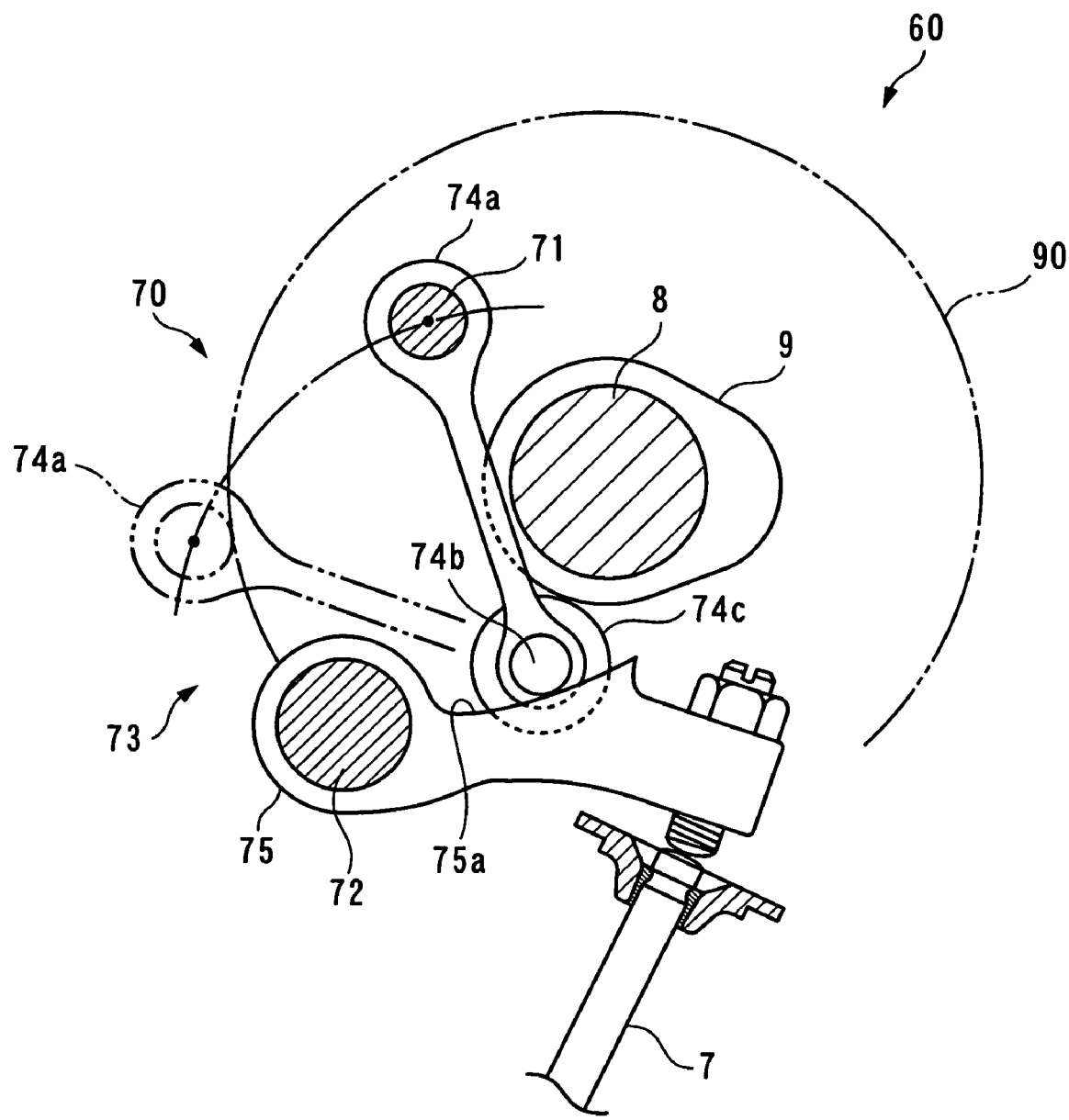
FIG. 4 is a schematic diagram generally showing the configuration of the exhaust side valve actuation mechanism.

Next, the aforementioned exhaust side valve actuation mechanism 60 will be described. As shown in FIG. 4, the exhaust side valve actuation mechanism 60 comprises an exhaust cam shaft 8, an exhaust cam 9, an exhaust lift varying mechanism 70, an exhaust cam phase varying mechanism 90, and the like. In this embodiment, the exhaust lift varying mechanism 70 and the exhaust cam phase varying mechanism 90 correspond to an internal EGR device.

Figure 5:
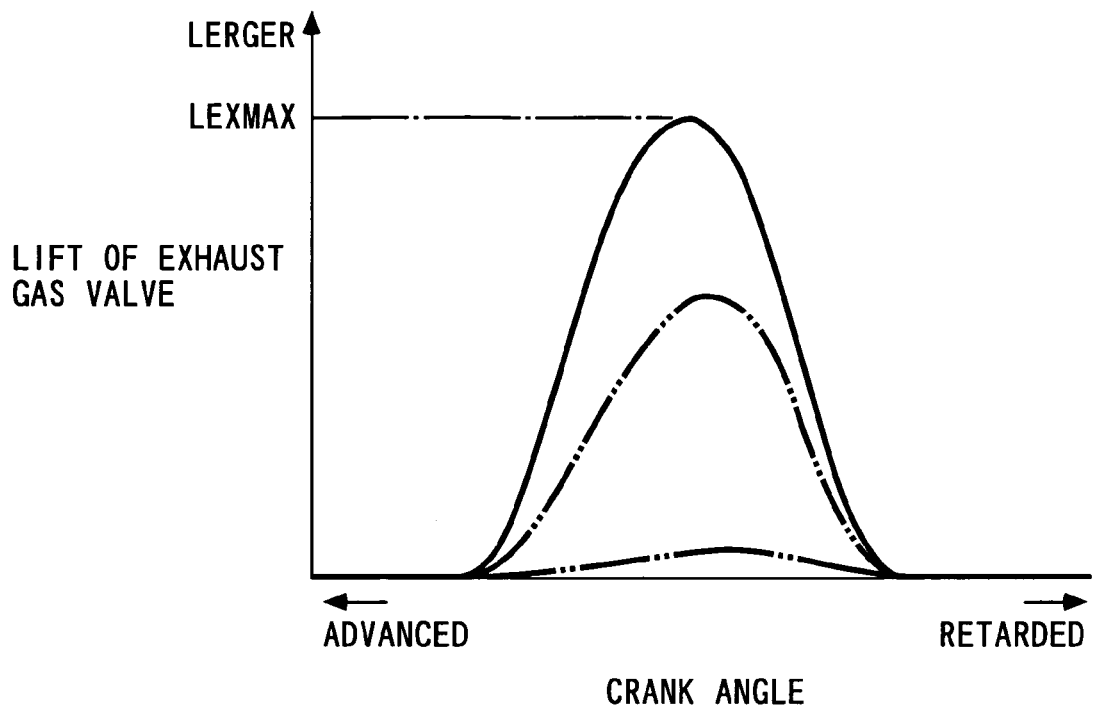
FIG. 5 is a diagram showing how an exhaust lift is changed by an exhaust lift varying mechanism.

The exhaust lift varying mechanism 70 drives the exhaust gas valve 7 to open and close through the rotation of the exhaust cam shaft 8 associated with the rotation of the crank shaft 3d, and continuously changes the exhaust lift between the value of zero and a predetermined maximum value LEXMAX (see FIG. 5), and is configured in a similar manner to that which has been previously proposed by the present applicant in Japanese Patent Application No. 2005-288057, so that its outline will be described in brief.

The exhaust lift varying mechanism 70 comprises a control shaft 71 and a rocker arm shaft 72, a rocker arm mechanism 73 provided on these shafts 71, 72 for each cylinder 3a, an exhaust lift actuator 80 (see FIG. 2) for simultaneously driving these rocker arm mechanisms 73, and the like.

The rocker arm mechanism 73 comprises a link 74a, a roller shaft 74b, a roller 74c, a rocker arm 75, and the like. The exhaust lift actuator 80 in turn is a combination of a motor, a deceleration gear mechanism (none of which is shown), and the like, and is electrically connected to the ECU 2, such that the exhaust lift actuator 80, as driven by a control input from the ECU 2, pivotally moves the control shaft 71, thereby pivotally moving the link 74a about the roller shaft 74b.

When the link 74a is at a zero lift position indicated by solid lines in FIG. 4, the exhaust cam 9 rotates, and the roller 74c is pressed toward the rocker arm shaft 72 by its cam nose, causing the link 74a to pivotally move about the control shaft 71 in the clockwise direction in FIG. 4. In this event, a guide face 75a of the rocker arm 75 has a shape which matches an arc about the control shaft 71, so that the rocker arm 75 is held at a valve closing position shown in FIG. 4 by an urging force of a valve spring. In this way, the exhaust lift is held at the value of zero, and the exhaust gas valve 7 is held in a closed valve state.

On the other hand, when the link 74a has pivotally moved from the zero lift position to the position toward the maximum lift position (position indicated by a two-dot chain line in FIG. 4) and remains held at that position, as the link 74a pivotally moves about the control shaft 71 in the clockwise direction in FIG. 4 by the rotation of the exhaust cam 9, the rocker arm 75 pivotally moves downward from the valve closing position shown in FIG. 4, while resisting against an urging force of the valve spring, to open the exhaust gas valve 7. In this event, the amount of pivotal movement of the rocker arm 75, i.e., the exhaust lift, is larger as the link 74a is present at a position closer to the maximum lift position side.

For the reason set forth above, the exhaust gas valve 7 opens with a larger lift as the link 74a is present at a position closer to the maximum lift position side. More specifically, while the exhaust cam 9 is rotating, the exhaust gas valve 7 opens in conformity to a valve lift curve indicated by a solid line in FIG. 5 when the link 74a is present at the maximum lift position, and the exhaust lift indicates its maximum value LEXMAX. Therefore, in the exhaust lift varying mechanism

70, the exhaust lift can be continuously changed between the value of zero and the predetermined maximum value LEX-MAX by pivotally moving the link 74a between the zero lift position and the maximum lift position.

The exhaust lift varying mechanism 70 is also provided with a pivotal angle sensor 26 (see FIG. 2). The pivotal angle sensor 26 detects a pivotal angle SAAEX of the control shaft 71, and outputs a detection signal indicative of that to the ECU 2.

Next, the exhaust cam phase varying mechanism 90 will be described. The exhaust cam phase varying mechanism 90 continuously changes a relative phase CAEX of the exhaust cam shaft 8 to the crank shaft 3d (hereinafter referred to as the "exhaust cam phase") to an advance side or to a retard side. Since this exhaust cam phase varying mechanism 90 is configured in a similar manner to that which has been previously proposed by the present applicant in Japanese Patent Application No. 2005-315161, so that its outline will be described in brief.

Figure 6:
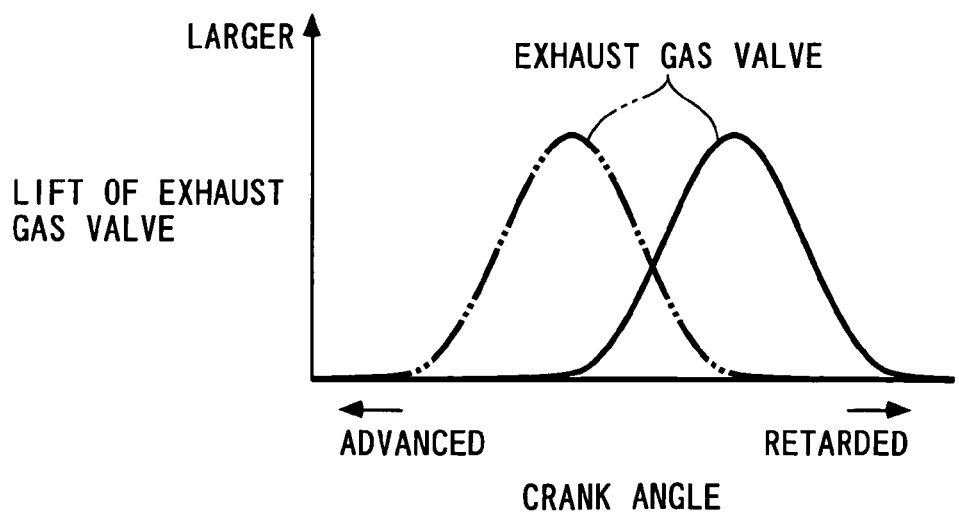
FIG. 6 is a diagram showing a valve lift curve of an exhaust gas valve when an exhaust cam phase is set at the most retarded value (solid line) and the most advanced value (two-dot chain line) by an exhaust cam phase varying mechanism.

The exhaust cam phase varying mechanism 90 is provided at an end of the exhaust cam shaft 8 closer to the exhaust sprocket, and comprises an exhaust cam phase electromagnetic valve 91, an advance chamber and a retard chamber (none of which is shown) to which a hydraulic pressure is supplied therethrough, and the like. The exhaust cam phase electromagnetic valve 91 is connected to the ECU 2, and changes the hydraulic pressure supplied to the advance chamber and the retard chamber in accordance with a control input from the ECU 2, thereby continuously changing the exhaust cam phase CAEX between a predetermined most retard value and a predetermined most advance value. In this way, the valve timing of the exhaust gas valve 7 is continuously changed between the most retarded timing indicated by a solid line in FIG. 6 and the most advanced timing indicated by a two-dot chain line in FIG. 6.

On the other hand, an exhaust cam angle sensor 26 (see FIG. 2) is provided at an end of the exhaust cam shaft 8 opposite to the exhaust cam phase varying mechanism 90. The exhaust cam angle sensor 26 is comprised, for example, of a magnet rotor and an MRE pickup, and outputs an EXCAM signal, which is a pulse signal, to the ECU 2 every predetermined cam angle (for example, 1°) in association with the rotation of the exhaust cam shaft 8. The ECU 2 calculates the exhaust cam phase CAEX based on the EXCAM signal and the aforementioned CRK signal.

As described above, in this engine 3, the lift and the valve timing of the exhaust gas valve 7 can be continuously changed by the exhaust side valve actuation mechanism 60, thereby making it possible to freely change the amount of previously burnt gases remaining in the cylinder 3a, i.e., the internal EGR amount. The previously burnt gases present a temperature higher than that of exhaust gases which are recirculated by the exhaust gas recirculation mechanism 16.

An accelerator opening sensor 27 is also connected to the ECU 2. The accelerator opening sensor 27 detects an accelerator opening AP which is a manipulation amount of an accelerator pedal, not shown, and outputs a detection signal indicative of that to the ECU 2.

The ECU 2 in turn is based on a microcomputer which is comprised of an I/O interface, a CPU, a RAM, a ROM and the like, and determines the operating condition of the engine 3 and executes a variety of control processes in accordance with the detection signals from a variety of sensors 20-27 mentioned above.

Specifically, the ECU 2 executes an EGR control process, a fuel injection control process, an ignition timing control process, a varying mechanism control process, and the like in accordance with the operating condition of the engine 3, as will be later described. Through these control processes, the engine 3 is operated in any operation mode in accordance with a combustion mode value STS_BURNCMD, later described, out of a stratified self ignition combustion mode, a stratified flame propagation combustion mode, a torch self ignition combustion mode, and a homogeneous flame propagation combustion mode.

The stratified self ignition combustion mode involves injecting a fuel only in a compression stroke to produce a stratified air-fuel mixture which is burnt with self ignition, and is executed when an operation range of the engine 3 is in a first predetermined operation range (see FIG. 9), as will be later described. In this regard, since the stratified air-fuel mixture is produced so as to burn with self ignition in the stratified self ignition combustion mode, a torch ignition is not essentially required. However, with the intention to prevent misfire and appropriately control a self ignition combustion timing, a torch ignition with the ignition plug 11 is executed even in the stratified self ignition combustion mode in the engine 3.

The stratified flame propagation combustion mode in turn involves injecting a fuel only in a compression mode to produce a stratified air-fuel mixture which is burnt with flame propagation with a torch ignition, and is executed when the operation range of the engine 3 is in a predetermined second operation range (see FIG. 9), as will be later described.

Further, the homogeneous flame propagation combustion mode involves injecting a fuel in an intake stroke to produce a homogeneous air-fuel mixture, and burning the same with flame propagation with a torch ignition, and is executed when the operation range of the engine 3 is in a predetermined third operation range (see FIG. 3) other than the aforementioned first and second operation ranges.

In this embodiment, the ECU 2 corresponds to a combustion mode selecting means, a total target EGR amount calculating means, a target in-cylinder gas temperature setting means, a target internal EGR amount calculating means, a target external EGR amount calculating means, and an EGR control means.

Figure 7:
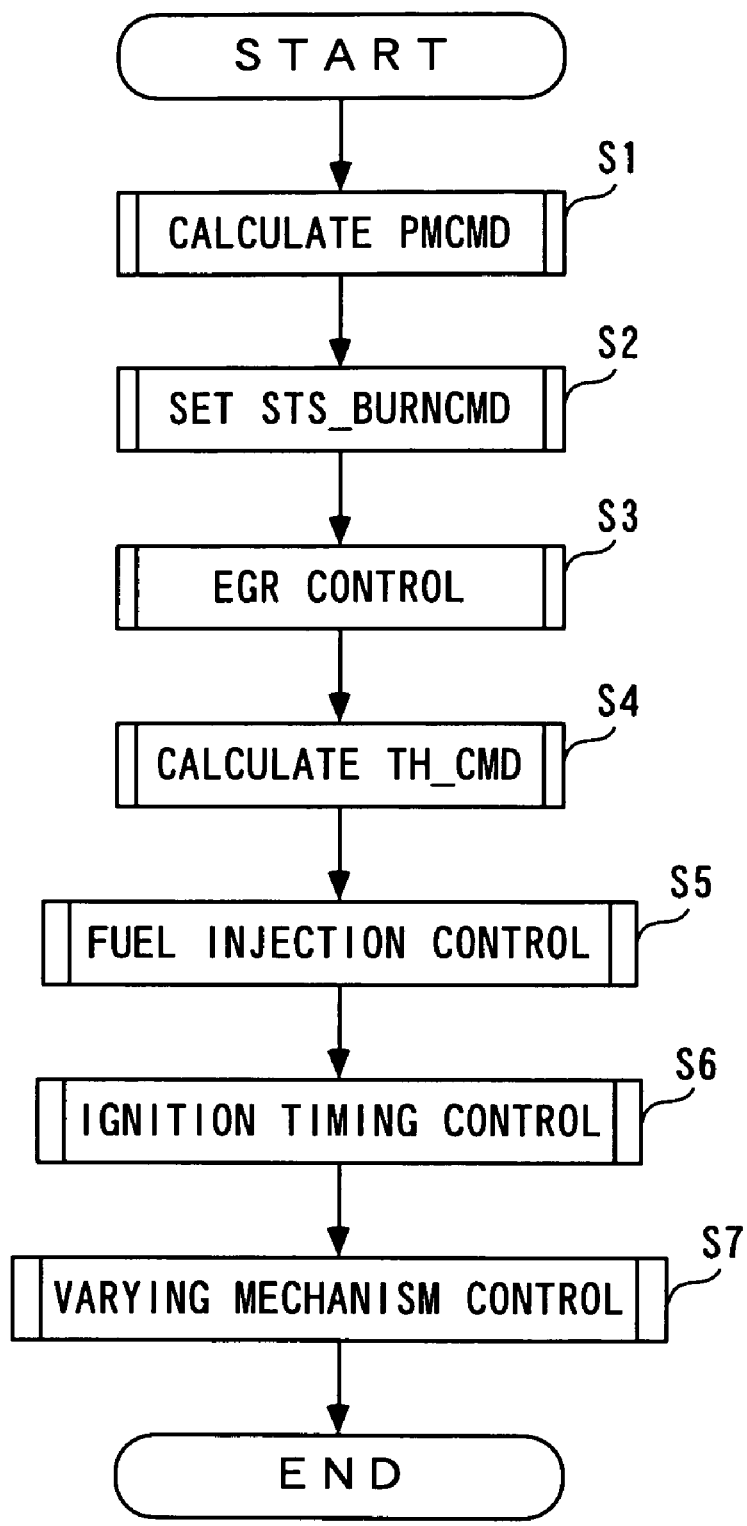
FIG. 7 is a flow chart showing a control process which is executed at a predetermined control period.

In the following, a variety of control processes executed by the ECU 2 at a predetermined control period will be described with reference to FIG. 7. Assume that a variety of values calculated or set in the following control processes are stored in the RAM of the ECU 2.

In this process, first at step 1 (abbreviated as "S1" in the figure. The same is applied to the following description), a required torque PMCMD is calculated. This required torque PMCMD is specifically calculated by searching a map, not shown, in accordance with the engine rotational speed NE and the accelerator opening AP.

Figure 8:
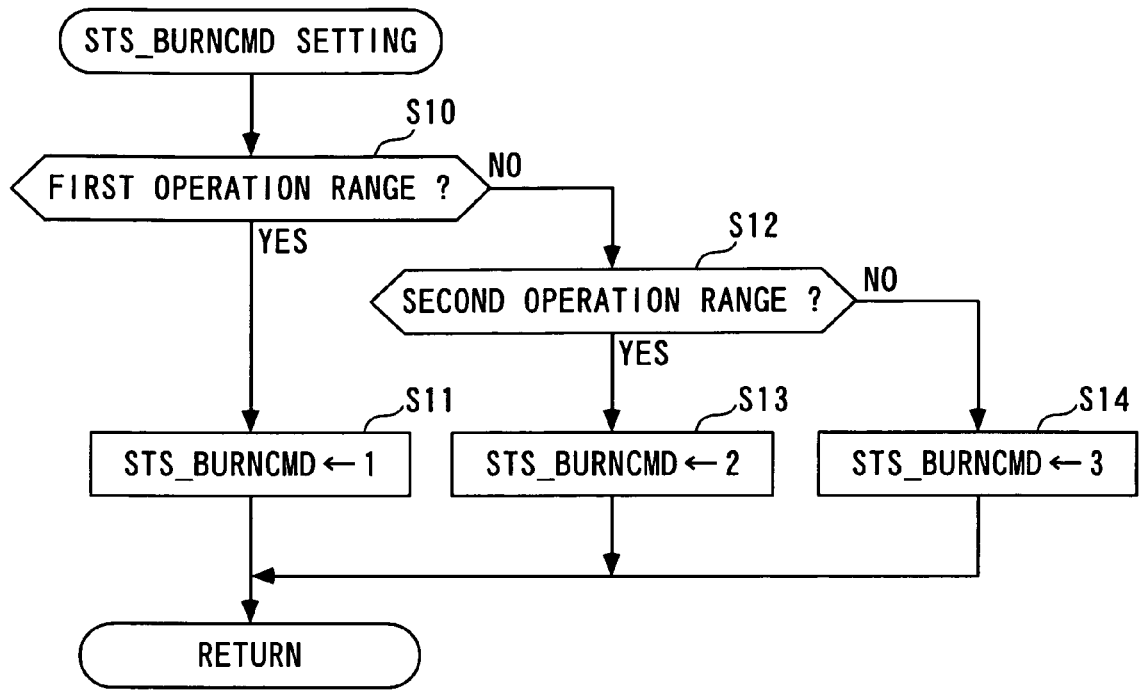
FIG. 8 is a flow chart showing a process for setting a combustion mode value STS_BURNCMD.

Next, at step 2, a combustion mode value STS_BURNCMD is set. Specifically, the combustion mode value STS_BURNCMD is set as shown in FIG. 8. As shown in FIG. 8, first at step 10, it is determined whether or not the engine rotational speed NE and the required torque PMCMD are in the first operation range indicated by hatchings in FIG. 9 by searching a map shown in FIG. 9.

When the result of this determination is YES, indicating that the engine rotational speed NE and the required torque PMCMD are in the first operation range, the process goes to step 11 on the assumption that the stratified self ignition combustion mode should be executed, and the combustion mode value STS_BURNCMD is set to the value of one for indicating to that effect. Subsequently, this process is terminated.

Figure 9:
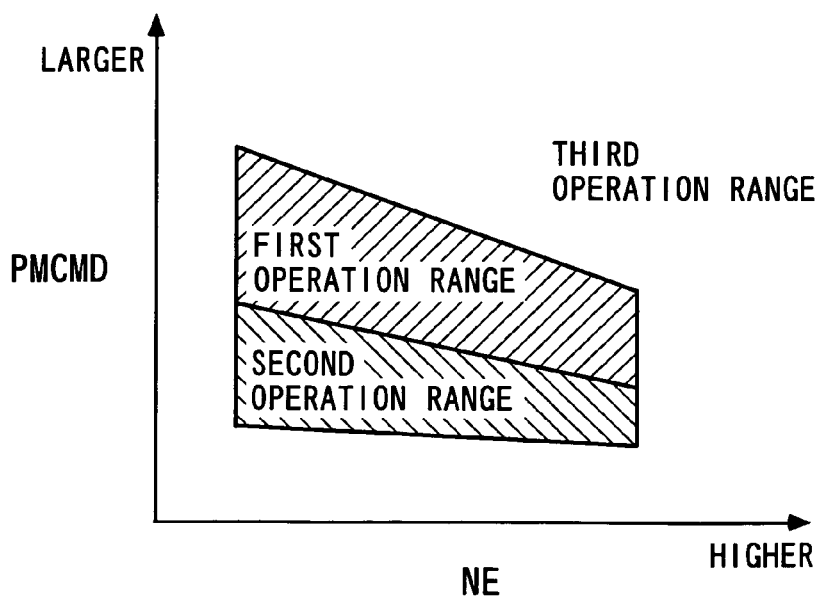
FIG. 9 is a diagram showing an example of a map used for setting the combustion mode value STS_BURNCMD.

On the other hand, when the result of the determination at step 10 is NO, the flow goes to step 12, where it is determined whether or not the engine rotational speed NE and the required torque PMCMD are in the second operation range indicated by hatchings by referencing the aforementioned map of FIG. 9.

When the result of this determination is YES, indicating that the engine rotational speed NE and the required torque PMCMD are in the second operation range, the process goes to step 13 on the assumption that the stratified flame propagation combustion mode should be executed, and the combustion mode value STS_BURNCMD is set to the value of two for indicting to that effect. Subsequently, this process is terminated.

On the other hand, when the result of the determination at step 12 is NO, indicating that the engine rotational speed NE and the required torque PMCMD are in the third operation range other than the first and second operation range, the process goes to step 14 on the assumption that the homogeneous flame propagation combustion mode should be executed, and the combustion mode value STS_BURNCMD is set to the value of three for indicating to that effect. Subsequently, this process is terminated.

Turning back to FIG. 7, after the combustion mode value STS_BURNCMD has been set at step 2 in the foregoing manner, the process goes to step 3, where the EGR control process is executed. In this EGR control process, as will be described below, a target EGR lift LCMD is calculated in order to control an external EGR amount through the exhaust gas recirculation mechanism 16, and a target pivotal angle SAAEXCMD and a target exhaust cam phase CAEXCMD are calculated in order to control an internal EGR amount through the exhaust lift varying mechanism 70 and the exhaust cam phase varying mechanism 90.

Figure 10:
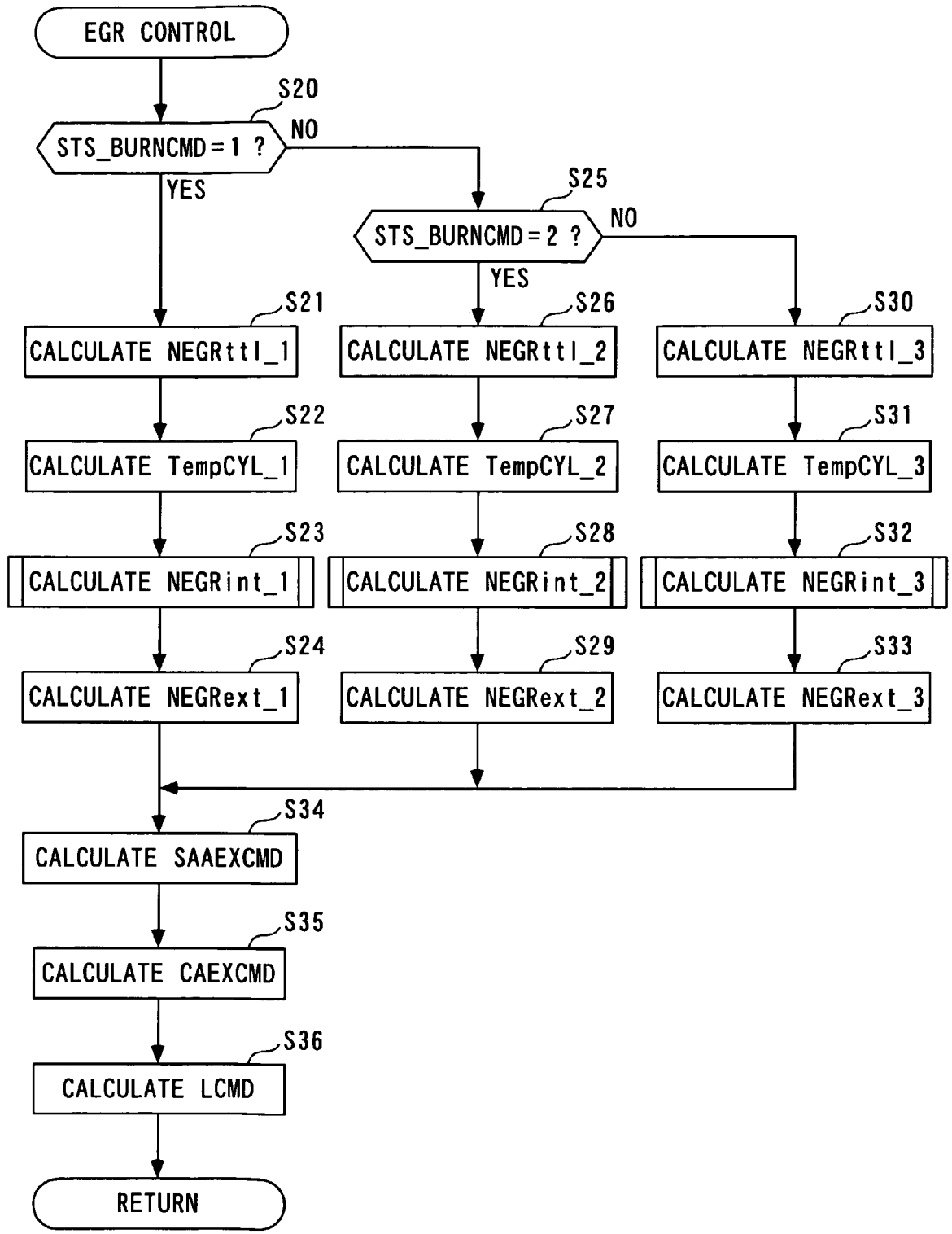
FIG. 10 is a flow chart showing an EGR control process.

The EGR control process is specifically executed as shown in FIG. 10. First, at step 20, it is determined whether or not the combustion mode value STS_BURNCMD has the value of one. When the result of this determination is YES, indicating that the engine rotational speed NE and the required torque PMCMD is in the first operation range in which the stratified self ignition combustion mode should be executed, the process goes to step 21, where a total target EGR amount NEGRttl_1 for the stratified self ignition combustion mode is calculated by searching a map, not shown, in accordance with the engine rotational speed NE and the required torque PMCMD.

Next, the process goes to step 22, where a target in-cylinder gas temperature TempCYL_1 for the stratified self ignition combustion mode is calculated by searching a map, not shown, in accordance with the engine rotational speed NE and the required torque PMCMD.

Figure 11:
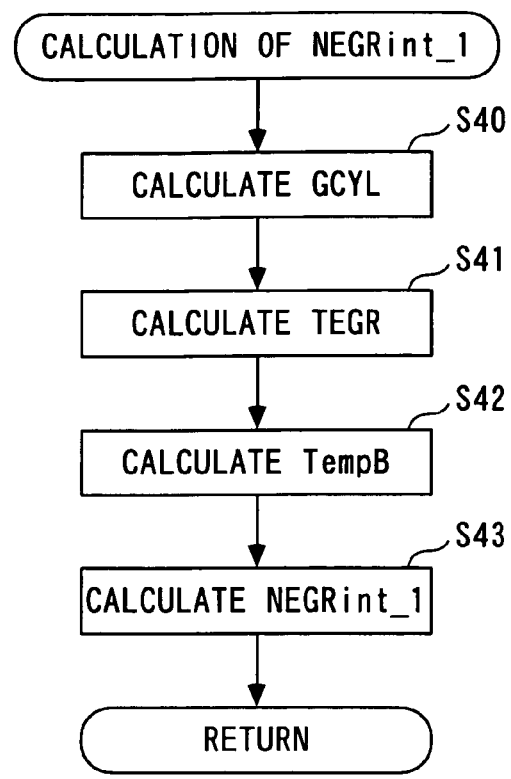
FIG. 11 is a flow chart showing a process for calculating a target internal EGR amount NEGRint_1 for stratified self ignition combustion mode.

Next, at step 23, a target internal EGR amount NEGRint_1 for the stratified self ignition combustion mode is calculated. This calculation process is executed as shown in FIG. 11.

First, at step 40, an unburnt gas amount GCYL is calculated by the following equation (1). This unburnt gas amount GCYL corresponds to an estimate of the total amount of gases filled in the cylinder 3a at the current control timing, i.e., an estimate of the sum total of a fresh air amount and the internal EGR amount.

[Equation 1]

$$GCYL = \frac{K \cdot PBA}{\text{TempCYLA\_1}} \quad (1)$$

The equation (1) above is derived from the gas state equation, and in the equation (1), TempCYLA_1 represents a converted absolute temperature value of the target in-cylinder gas temperature TempCYL_1 for the stratified self ignition combustion mode, and K represents a constant which is determined on the basis of the volume of the cylinder 3a, the gas constant, and the like.

Next, the process goes to step 41, where an internal EGR temperature TEGR is calculated by the following equation (2). This internal EGR temperature TEGR corresponds to the temperature of previously burnt gases remaining in the cylinder 3a, which is used as internal EGR gases during the next combustion.

[Equation 2]

$$\text{TEGR} = \alpha \cdot \text{TEXGAS}z + \beta \cdot \text{TempB}z \quad (2)$$

In the equation (2) above, TEXGASz represents a preceding value of a previously burnt gas temperature TEXGAS. This previously burnt gas temperature TEXGAS is calculated by a calculation approach proposed by the present applicant in Japanese Patent Application No. 2005-288061, though its specific calculation approach is omitted here. TempBz in turn represents a preceding value of an ambient temperature TempB, later described, and α and β represent predetermined weighting coefficients which are set to satisfy α+β=1, 0<α<1, 0<β<1. In other words, the internal EGR temperature TEGR is calculated as a weighted average of the two values TempBz, TEXGASz.

At step 42 subsequent to step 41, the ambient temperature TempB is calculated by the following equation (3). The ambient temperature TempB represents the ambient temperature which affects the temperature of the previously burnt gas (for example, the temperature on the inner wall of the cylinder 3a) for a time period until previously burnt gases remaining in the cylinder 3a is used in the next combustion.

[Equation 3]

$$\text{TempB} = (1-\alpha) \cdot \text{TEXGAS}z + (1-\beta) \cdot \text{TempB}z \quad (3)$$

Next, the process goes to step 43, where a target internal EGR amount NEGRint_1 is calculated by the following equation (4). Subsequently, this process is terminated.

[Equation 4]

$$\text{NEGRint\_1} = \frac{GCYL \cdot (\text{TempCYL\_1} - TA)}{(TEGR - TA)} \quad (4)$$

Turning back to FIG. 10, after the target internal EGR amount NEGRint_1 for the stratified self ignition combustion mode has been calculated at step 23 in the foregoing manner, the process goes to step 24, where a target external EGR amount NEGRext_1 for the stratified self ignition combustion mode is calculated by the following equation (5):

[Equation 5]

$$\text{NEGRext\_1} = \text{NEGRttl\_1} - \text{NEGRint\_1} \quad (5)$$

On the other hand, when the result of the determination at step 20 is NO, the process goes to step 25, where it is determined whether or not the combustion mode value STS_BURNCMD has the value of two. When the result of this determination is YES, indicating that the engine rotational speed NE and the required torque PMCMD are in the second operation range in which the stratified flame propagation combustion mode should be executed, the process goes to step 26, where a total target EGR amount NEGRttl_2 for the stratified flame propagation combustion mode is calculated by searching a map, not shown, in accordance with the engine rotational speed NE and the required torque PMCMD.

Next, the process goes to step 27, where a target in-cylinder gas temperature TempCYL_2 for the stratified flame propagation combustion mode is calculated by searching a map, not shown, in accordance with the engine rotational speed NE and the required torque PMCMD.

At step 28 subsequent to step 27, a target internal EGR amount NEGRint_2 for the stratified flame propagation combustion mode is calculated. The target internal EGR amount NEGRint_2 for the stratified flame propagation combustion mode is calculated by equations in which the three values TempCYLA_1, TempCYL_1, NEGRint_1 for the stratified self ignition combustion mode are replaced with three values TempCYLA_2, TempCYL_2, NEGRttl_2, respectively, in the aforementioned equations (1)-(4).

Next, the process goes to step 29, where a target external EGR amount NEGRext_2 for the stratified flame propagation combustion mode is calculated. The target external EGR amount NEGRext_2 for the stratified flame propagation combustion mode is calculated by an equation in which the three values NEGRext_1, NEGRttl_1, NEGRint_1 for the stratified self ignition combustion mode are replaced with three values NEGRext_2, NEGRttl_2, NEGRint_2 for the stratified flame propagation combustion mode, respectively, in the aforementioned equation (5).

On the other hand, when the result of the determination at step 25 is NO, indicating that the engine rotational speed NE and the required torque PMCMD are in the third operation range in which the homogeneous flame propagation combustion mode should be executed, the process goes to step 30, where a total target EGR amount NEGRttl_3 for the homogeneous flame propagation combustion mode is calculated by searching a map, not shown, in accordance with the engine rotational speed NE and the required torque PMCMD. In this map, the total target EGR amount NEGRttl_3 for the homogeneous flame propagation combustion mode is set to an upper limit value in a region in which no reduction in combustion state will arise.

It should be noted that in the following description, the target EGR amount NEGRttl_1, NEGRttl_2, NEGRttl_3 for the three combustion modes are collectively labeled "NEGRttl_1-3" or "NEGRttl_i" as appropriate. In addition, "i" in "NEGRttl_i" is a suffix indicative of the value of one-three.

Figure 12:
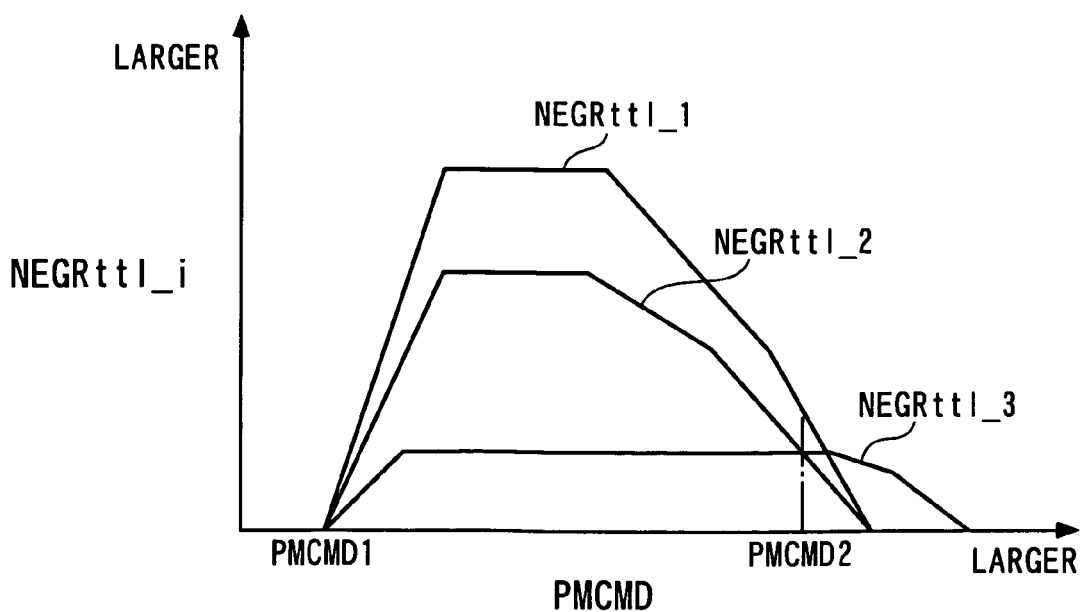
FIG. 12 is a diagram showing total target EGR amounts NEGRttl_i for three combustion modes for a required torque PMCMD.

Here, in the three maps used in the aforementioned steps 21, 26, 30, respectively, the total target EGR amount NEGRttl_3 for the three combustion modes are set in a relationship as shown in FIG. 12. FIG. 12 represents the relationship of the three total target EGR amounts NEGRttl_1-3 to the required torque PMCMD when the engine rotational speed is at a predetermined rotational speed, where PMCMD1, PMCMD2 represent predetermined values of the required torque which satisfy PMCMD<PMCMD2.

As shown in FIG. 12, in a region in which PMCMD1<PMCMD<PMCMD2, the total target EGR amount NEGRttl_1, NEGRttl_2 for the stratified self ignition combustion mode and the stratified flame propagation combustion mode are set to values larger than the total target EGR amount NEGRttl_3 for the homogeneous flame propagation combustion mode. This is because a stable combustion state can be provided even with an increased EGR amount in the stratified self ignition combustion mode and the stratified flame propagation combustion mode, as compared with the homogeneous flame propagation combustion mode, due to the combustion characteristics of the stratified air-fuel mixture.

At step 31 subsequent to step 30, a target in-cylinder gas temperature TempCYL_3 for the homogeneous flame propagation combustion mode is calculated by searching a map, not shown, in accordance with the engine rotational speed NE and the required torque PMCMD. It should be noted that in the following description, the target in-cylinder gas temperatures TempCYL_1, TempCYL_2, TempCYL_3 for the three combustion modes are collectively labeled "TempCYL_1-3" or "TempCYL_i" as appropriate.

Next, the process goes to step 32, where a target internal EGR amount NEGRint_3 for the homogeneous flame propagation combustion mode is calculated. The target internal EGR amount NEGRint_3 for the homogeneous flame propagation combustion mode is calculated by equations in which the three values TempCYLA_1, TempCYL_1, NEGRint_1 for the stratified self ignition combustion mode are replaced with the three value TempCYLA_3, TempCYL_3, NEGRttl_3 for the homogeneous flame propagation combustion mode, respectively, in the aforementioned equations (1)-(4), and is calculated, during a high-load operation of the engine 3, to such a value that causes the proportion of a low-temperature recirculated gas is higher as compared with the previously burnt gases in the total target EGR amount NEGRttl_3. It should be noted that in the following description, the target internal EGR amounts NEGRint_1, NEGRint_2, NEGRint_3 for the three combustion modes are collectively labeled "NEGRint_1-3" or "NEGRint_i" as appropriate.

Next, the process goes to step 33, where a target external EGR amount NEGext_3 for the homogeneous flame propagation combustion mode is calculated. The target external EGR amount NEGRext_3 for the homogeneous flame propagation combustion mode is calculated by an equation in which the three values NEGRext_1, NEGRttl_1, NEGRint_1 for the stratified self ignition combustion mode are replaced with the three values NEGRext_3, NEGRttl_3, NEGRint_3 for the homogeneous flame propagation combustion mode, respectively, in the aforementioned equation (5). It should be noted that in the following description, the target external EGR amounts NEGRext_1, NEGRext_2, NEGRext_3 for the three combustion modes are collectively labeled "NEGRext_1-3" or "NEGRext_i" as appropriate.

Subsequent to any of the foregoing steps 24, 29, 32, at steps 34 and 35, a target pivotal angle SAAEXCEM and a target exhaust cam phase CAEXCMD are calculated, respectively, on the basis of a value of the target internal EGR amount NEGRint_i which was calculated at a current control timing.

Next, the process goes to step 36, where a target EGR lift LCMD is calculated on the basis of a value of the target external EGR amount NEGRext_i which was calculated at the current control timing. Subsequently, this process is terminated.

Turning back to FIG. 7, after the EGR control process has been executed at step 3 in the foregoing manner, the process goes to step 4, where a target throttle valve opening TH_CMD is calculated by searching a map, not shown, in accordance with the engine rotational speed and the required torque PMCMD. The target throttle valve opening TH_CMD is set to a larger value for the stratified self ignition combustion mode and the stratified flame propagation combustion mode than a value for the homogeneous flame propagation combustion mode with the intention to reduce a pumping loss.

Next, the process goes to step 5, where the fuel injection control process is executed. In this fuel injection control process, valve opening and closing timings and a valve opening time of the fuel injection valve 10 are calculated in accordance with the combustion mode value STS_BURNCMD and the operating condition of the engine 3.

At step 6 subsequent to step 5, the ignition timing control process is executed. In this ignition timing control process, an ignition timing is calculated in accordance with the combustion mode value STS_BURNCMD and the operating condition of the engine 3.

Next, at step 7, this process is terminated after the varying mechanism control process is executed. In this varying mechanism control process, control inputs to the fuel injection valve 10, the ignition plug 11, the TH actuator 13*b*, the EGR control valve 16*b*, the exhaust lift actuator 80, and the exhaust cam phase electromagnetic valve 91 are calculated, respectively, on the bases of a variety of values calculated at the foregoing steps 3-6.

More specifically, the control input to the TH actuator 13*b* is calculated on the basis of the target throttle valve opening TH_CMD. In this way, the throttle valve opening TH is controlled to reach the target throttle valve opening TH_CMD through the throttle valve mechanism 13. Also, the control input to the EGR control valve 16*b* is calculated such that the EGR lift LACT converges to the target EGR lift LCMD. As a result, the external EGR amount is controlled to converge to the external EGR amount NEGRext_i through the exhaust gas recirculation mechanism 16.

Further, the control input to the exhaust lift actuator 80 is calculated such that the pivotal angle SAAEX converges to the target pivotal angle SAAEXCMD, while the control input to the exhaust cam phase electromagnetic valve 91 is calculated such that the exhaust cam phase CAEX converges to the target exhaust cam phase CAEXCMD. As a result, the internal EGR amount is controlled to converge to the target internal EGR amount NEGRint_i through the exhaust lift varying mechanism 70 and the exhaust cam phase varying mechanism 90.

As described above, according to the EGR control apparatus 1 of this embodiment, the combustion mode value STS_BURNCMD is set in accordance with the engine rotational speed NE and the required torque PMCMD, the total target EGR amount NEGRttl_i and the target in-cylinder gas temperature TempCYL_i are calculated in accordance with the combustion mode value STS_BURNCMD, the target internal EGR amount NEGRint_i is calculated in accordance with the target in-cylinder gas temperature TempCYL_i, and the target external EGR amount NEGRext_i is calculated by subtracting the target internal EGR amount NEGRint_i from the total target EGR amount NEGRttl_i. Then, by controlling the exhaust gas recirculation mechanism 16 with a control input which is calculated on the basis of the target external EGR amount NEGRext_i, the external EGR amount is controlled to converge to the target external EGR amount NECRext_i. Further, by driving the exhaust lift varying mechanism 70 and the exhaust cam phase varying mechanism 90 with a control input which is calculated on the basis of the target internal EGR amount NEGRint_i, the internal EGR amount is controlled to converge to the target internal EGR amount NEGRint_i.

Since the internal EGR amount and the external EGR amount are controlled in the foregoing manner, when the stratified self ignition combustion mode is executed with STS_BURNCMD=1, the temperature of a stratified air-fuel mixture in the combustion chamber 3*e* can be increased to a temperature at which it will appropriately burn with self ignition, making it possible to ensure that the stratified air-fuel mixture can be burnt with self ignition. As a result, technical advantages can be provided, as described below, when the stratified air-fuel mixture is burnt with self ignition. Specifically, since a more stable combustion state can be provided than when a homogeneous air-fuel mixture is burnt, due to the combustion characteristics of the stratified air-fuel mixture, the total target EGR amount NEGRttl_1 for the stratified self ignition combustion mode can be set to a value larger than the value NEGRttl_3 for the homogeneous flame propagation combustion mode in a region of PMCMD1<PMCMD<PMCMD2. In this way, the throttle valve opening TH can be controlled to a larger value, thereby reducing a pumping loss, the combustion efficiency can be increased, and a good fuel efficiency can be ensured. In addition, the combustion temperature can be reduced because the entire stratified air-fuel mixture simultaneously burns, it is possible to reduce the amount of emitted NOx and improve the exhaust gas characteristic.

Also, when the stratified flame propagation combustion mode is executed with STS_BURNCMD=2, the total target EGR amount NEGRttl_2 for the stratified flame propagation combustion mode can be set to a larger value than the value NEGRttl_3 for the homogeneous flame propagation combustion mode in the region of PMCMDD1<PMCMD<PMCMD2 for the reason set forth above. In this way, the combustion efficiency can be improved, while reducing the pumping loss, as compared with the homogeneous flame propagation combustion mode, making it possible to ensure a good fuel efficiency. In addition, when the target internal EGR amount NEGRint_2 is calculated such that the proportion of the target external EGR amount NEGRext_2 is higher in the total target EGR amount NEGRttl_2, the amount of emitted NOx can be reduced by reducing the combustion temperature. On the other hand, when the target internal EGR amount NEGRint_2 is calculated such that the proportion of the target internal EGR amount NEGRint_2 is higher in the total target EGR amount NEGRttl_2, a partial self ignition combustion can be produced by increasing the combustion temperature, thereby making it possible to reduce the amount of emitted NOx and improve the exhaust gas characteristic.

Also, when the stratified flame propagation combustion mode is executed with STS_BURNCMD=3, the total target EGR amount NEGRllt_3 for the homogeneous flame propagation combustion mode is set to an upper limit value in a region in which no reduction in combustion state arises, so that the pumping loss can be reduced as much as possible while ensuring a good combustion state. In addition, since the target internal EGR amount NEGRint_3 is calculated such that the proportion of a low-temperature recirculated gas, as compared with previously burnt gases, is higher during a high-load operation of the engine 3, the knocking can be appropriately prevented from occurring by the recirculated gas, while avoiding the ignition timing retard control as much as possible, thereby making it possible to improve the combustion efficiency, engine output, and drivability.

Also, while the embodiment has shown an example in which the exhaust lift varying mechanism 70 and the exhaust cam phase varying mechanism 90 for changing the amount of previously burnt gases remaining in the cylinder 3*a* are used as the internal EGR device, the internal EGR device of the present invention is not so limited, but any mechanism may be available as long as it is capable of changing the amount of previously burnt gases which is left within the cylinder. For example, an intake lift varying mechanism and an intake cam phase varying mechanism which are configured in a similar manner to the exhaust lift varying mechanism 70 and the exhaust cam phase varying mechanism 90, respectively, and which are capable of changing a valve lift and a valve timing of the intake air valve 4, respectively, may be used.

Also, while the embodiment has shown an example in which the exhaust gas recirculation mechanism 16 is used as the external EGR device, the external EGR device of the present invention is not so limited, but any device can be used as long as it is capable of recirculating exhaust gases discharged from the cylinder to the exhaust passage into the cylinder.

Further, while the embodiment has shown an example in which the EGR control apparatus 1 of the present invention is applied to the internal combustion engine 3 which is operated in three combustion modes including the stratified self ignition combustion mode, the stratified flame propagation combustion mode, and the homogeneous flame propagation combustion mode, as a plurality of combustion modes, the EGR control apparatus 1 of the present invention can also be applied to an internal combustion engine which is operated in combustion modes other than those, in addition to the three combustion modes. For example, the EGR control apparatus 1 of the present invention may be applied to an internal combustion engine which is operated in a torch self ignition combustion mode which involves forming an air-fuel mixture including both a stratified air-fuel mixture and a homogeneous air-fuel mixture, burning the stratified air-fuel mixture with a spark ignition, and burning the homogeneous air-fuel mixture with self ignition using the burning stratified air-fuel mixture as a torch, in addition to the three combustion modes mentioned above.

What is claimed is:

1. An EGR control apparatus for an internal combustion engine which has an external EGR device for changing the amount of exhaust gases discharged from a cylinder to an exhaust passage and recirculated into the cylinder as an external EGR amount, and an internal EGR device for changing the amount of previously burnt gases generated in the cylinder which is left within the cylinder as a gas at a higher temperature than the exhaust gases as an internal EGR amount, and is operated in a combustion mode which is switched among a plurality of combustion modes including a stratified self ignition combustion mode for burning a stratified air-fuel mixture with self ignition, a stratified flame propagation combustion mode for burning the stratified air-fuel mixture with a spark ignition, and a homogeneous flame propagation combustion mode for burning a homogeneous air-fuel mixture with a spark ignition, said EGR control apparatus comprising:

combustion mode selecting means for selecting one of the plurality of combustion modes;

total target EGR amount calculating means for calculating a total target EGR amount which is a target for the sum total of the internal EGR amount and the external EGR amount in accordance with the selected combustion mode;

target in-cylinder gas temperature setting means for setting a target temperature of an unburnt gas within the cylinder as a target in-cylinder gas temperature in accordance with the selected combustion mode;

target internal EGR amount calculating means for calculating a target internal EGR amount which is a target of the internal EGR amount in accordance with the set target in-cylinder gas temperature;

target external EGR amount calculating means for calculating a target external EGR amount which is a target of the external EGR amount by subtracting the calculated target internal EGR amount from the calculated total target EGR amount; and EGR control means for controlling the internal EGR amount and the external EGR amount, respectively, so as to reach the target internal EGR amount and the target external EGR amount by driving said internal EGR device and said external EGR device.

2. An EGR control apparatus according to claim 1, wherein said total target EGR amount calculating means sets the total target EGR amount to a larger value when one of the stratified self ignition combustion mode and the stratified flame propagation combustion mode is selected than when the homogeneous flame propagation combustion mode is selected.

3. An EGR control apparatus according to claim 1, wherein said internal EGR device is a lift varying mechanism for continuously changing a lift of at least one of an intake air valve and an exhaust air valve.

4. An EGR control apparatus according to claim 1, wherein said internal EGR device is a phase varying mechanism for continuously changing a relative phase of at least one of an intake cam shaft and an exhaust cam shaft to a crank shaft.

5. An EGR control method for an internal combustion engine which has an external EGR device for changing the amount of exhaust gases discharged from a cylinder to an exhaust passage and recirculated into the cylinder as an external EGR amount, and an internal EGR device for changing the amount of previously burnt gases generated in the cylinder which is left within the cylinder as a gas at a higher temperature than the exhaust gases as an internal EGR amount, and is operated in a combustion mode which is switched among a plurality of combustion modes including a stratified self ignition combustion mode for burning a stratified air-fuel mixture with self ignition, a stratified flame propagation combustion mode for burning the stratified air-fuel mixture with a spark ignition, and a homogeneous flame propagation combustion mode for burning a homogeneous air-fuel mixture with a spark ignition, said EGR control method comprising the steps of:

selecting one of the plurality of combustion modes;

calculating a total target EGR amount which is a target for the sum total of the internal EGR amount and the external EGR amount in accordance with the selected combustion mode;

setting a target temperature of an unburnt gas within the cylinder as a target in-cylinder gas temperature in accordance with the selected combustion mode;

calculating a target internal EGR amount which is a target of the internal EGR amount in accordance with the set target in-cylinder gas temperature;

calculating a target external EGR amount which is a target of the external EGR amount by subtracting the calculated target internal EGR amount from the calculated total target EGR amount; and controlling the internal EGR amount and the external EGR amount, respectively, so as to reach the target internal EGR amount and the target external EGR amount by driving said internal EGR device and said external EGR device.

6. An EGR control method according to claim 5, wherein said total target EGR amount calculating step includes setting the total target EGR amount to a larger value when one of the stratified self ignition combustion mode and the stratified flame propagation combustion mode is selected than when the homogeneous flame propagation combustion mode is selected.

7. An EGR control method according to claim 5, wherein said internal EGR device is a lift varying mechanism for continuously changing a lift of at least one of an intake air valve and an exhaust air valve.

8. An EGR control method according to claim 5, wherein said internal EGR device is a phase varying mechanism for continuously changing a relative phase of at least one of an intake cam shaft and an exhaust cam shaft to a crank shaft.

* * * * *